(12) United States Patent
Bansal et al.

(10) Patent No.: US 9,311,598 B1
(45) Date of Patent: Apr. 12, 2016

(54) AUTOMATIC CAPTURE OF DETAILED ANALYSIS INFORMATION FOR WEB APPLICATION OUTLIERS WITH VERY LOW OVERHEAD

(75) Inventors: Jyoti Bansal, San Francisco, CA (US); Bhaskar Sankara, San Francisco, CA (US); Manoj Acharya, San Francisco, CA (US); Vinay Srinivasaiah, San Francisco, CA (US); Binil Thomas, San Francisco, CA (US)

(73) Assignee: AppDynamics, Inc., San Francisco, CA (US)

( * ) Notice: Subject to any disclaimer, the term of this patent is extended or adjusted under 35 U.S.C. 154(b) by 337 days.

(21) Appl. No.: 13/365,171

(22) Filed: Feb. 2, 2012

(51) Int. Cl.
G06F 9/46 (2006.01)
G06N 5/00 (2006.01)

(52) U.S. Cl.
CPC .................................. *G06N 5/00* (2013.01)

(58) Field of Classification Search
CPC ........... G06F 11/34; G06F 11/36; G06F 9/50; G06Q 10/06
USPC ........................................................... 706/12
See application file for complete search history.

(56) References Cited

U.S. PATENT DOCUMENTS

| | | | |
|---|---|---|---|
| 5,781,703 A | 7/1998 | Desai et al. |
| 6,002,872 A | 12/1999 | Alexander et al. |
| 6,158,024 A | 12/2000 | Mandal |
| 6,225,995 B1 | 5/2001 | Jacobs et al. |
| 6,295,548 B1 | 9/2001 | Klein et al. |
| 6,324,492 B1 | 11/2001 | Rowe |
| 6,324,683 B1 | 11/2001 | Fuh et al. |
| 6,349,406 B1 | 2/2002 | Levine et al. |
| 6,378,070 B1 | 4/2002 | Chan et al. |
| 6,457,142 B1 | 9/2002 | Klemm et al. |
| 6,496,825 B1 | 12/2002 | Klein et al. |
| 6,507,805 B1 | 1/2003 | Gordon et al. |
| 6,513,155 B1 | 1/2003 | Alexander et al. |
| 6,529,932 B1 | 3/2003 | Dadiomov et al. |
| 6,539,339 B1 | 3/2003 | Berry et al. |
| 6,546,548 B1 | 4/2003 | Berry et al. |
| 6,553,564 B1 | 4/2003 | Alexander et al. |
| 6,560,773 B1 | 5/2003 | Alexander et al. |
| 6,598,012 B1 | 7/2003 | Berry et al. |

(Continued)

OTHER PUBLICATIONS

U.S. Appl. No. 13/189,360, filed Jul. 22, 2011, Jyoti Bansal, Automatic Capture of Diagnostic Data Based on Transaction Behavior Learning.

(Continued)

*Primary Examiner* — Kakali Chaki
*Assistant Examiner* — Michael Zidanic
(74) *Attorney, Agent, or Firm* — Bachmann Law Group

(57) ABSTRACT

A system monitors a network or web application provided by one or more distributed applications and provides data for each and every method instance in an efficient low-cost manner. The web application may be provided by one or more web services each implemented as a virtual machine or one or more applications implemented on a virtual machine. Agents may be installed on one or more servers at an application level, virtual machine level, or other level. The agent may identify one or more hot spot methods based on current or past performance, functionality, content, or business relevancy. Based on learning techniques, efficient monitoring, and resource management, the present system may capture data for and provide analysis information for outliers of a web application with very low overhead.

26 Claims, 10 Drawing Sheets

(56) References Cited

U.S. PATENT DOCUMENTS

| | | |
|---|---|---|
| 6,604,210 B1 | 8/2003 | Alexander et al. |
| 6,651,243 B1 | 11/2003 | Berry et al. |
| 6,658,652 B1 | 12/2003 | Alexander et al. |
| 6,662,358 B1 | 12/2003 | Berry et al. |
| 6,718,230 B2 | 4/2004 | Nishiyama |
| 6,721,941 B1 | 4/2004 | Morshed et al. |
| 6,728,949 B1 | 4/2004 | Bryant et al. |
| 6,728,955 B1 | 4/2004 | Berry et al. |
| 6,732,357 B1 | 5/2004 | Berry et al. |
| 6,735,758 B1 | 5/2004 | Berry et al. |
| 6,751,789 B1 | 6/2004 | Berry et al. |
| 6,754,890 B1 | 6/2004 | Berry et al. |
| 6,760,903 B1 | 7/2004 | Morshed et al. |
| 6,904,594 B1 | 6/2005 | Berry et al. |
| 6,944,797 B1 | 9/2005 | Guthrie et al. |
| 6,978,401 B2 | 12/2005 | Avvari et al. |
| 6,985,912 B2 | 1/2006 | Mullins et al. |
| 6,990,521 B1 | 1/2006 | Ross |
| 7,124,354 B1 | 10/2006 | Ramani et al. |
| 7,233,941 B2 | 6/2007 | Tanaka |
| 7,328,213 B2 | 2/2008 | Suzuki et al. |
| 7,389,497 B1 | 6/2008 | Edmark et al. |
| 7,389,514 B2 | 6/2008 | Russell et al. |
| 7,406,523 B1 | 7/2008 | Kruy et al. |
| 7,496,901 B2 | 2/2009 | Begg et al. |
| 7,499,951 B2 | 3/2009 | Mueller et al. |
| 7,506,047 B2 | 3/2009 | Wiles, Jr. |
| 7,519,959 B1 | 4/2009 | Dmitriev |
| 7,523,067 B1 | 4/2009 | Nakajima |
| 7,577,105 B2 | 8/2009 | Takeyoshi et al. |
| 7,606,814 B2 | 10/2009 | Deily et al. |
| 7,689,688 B2 | 3/2010 | Iwamoto |
| 7,721,268 B2 | 5/2010 | Loh et al. |
| 7,730,489 B1 | 6/2010 | Duvur et al. |
| 7,739,675 B2 | 6/2010 | Klein |
| 7,792,948 B2 | 9/2010 | Zhao et al. |
| 7,836,176 B2 | 11/2010 | Gore et al. |
| 7,844,033 B2 | 11/2010 | Drum et al. |
| 7,877,642 B2 | 1/2011 | Ding et al. |
| 7,886,297 B2 | 2/2011 | Nagano et al. |
| 7,908,346 B2 | 3/2011 | Boykin et al. |
| 7,953,850 B2 | 5/2011 | Mani et al. |
| 7,953,895 B1 | 5/2011 | Narayanaswamy et al. |
| 7,966,172 B2 | 6/2011 | Ruiz et al. |
| 7,979,569 B2 | 7/2011 | Eisner et al. |
| 7,987,453 B2 | 7/2011 | DeWitt et al. |
| 7,992,045 B2 | 8/2011 | Bansal et al. |
| 8,001,546 B2 | 8/2011 | Felt et al. |
| 8,005,943 B2 | 8/2011 | Zuzga et al. |
| 8,069,140 B2 | 11/2011 | Enenkiel |
| 8,099,631 B2 | 1/2012 | Tsvetkov |
| 8,117,599 B2 | 2/2012 | Edmark et al. |
| 8,132,170 B2 | 3/2012 | Kulper et al. |
| 8,155,987 B2 | 4/2012 | Jaeck et al. |
| 8,205,035 B2 | 6/2012 | Reddy et al. |
| 8,286,139 B2 | 10/2012 | Jones et al. |
| 8,438,427 B2 | 5/2013 | Beck et al. |
| 8,560,449 B1 | 10/2013 | Sears |
| 8,606,692 B2 | 12/2013 | Carleton et al. |
| 8,843,684 B2 | 9/2014 | Jones et al. |
| 8,938,533 B1 | 1/2015 | Bansal |
| 9,015,317 B2 | 4/2015 | Bansal |
| 9,037,707 B2 | 5/2015 | Bansal |
| 2002/0016839 A1 | 2/2002 | Smith et al. |
| 2002/0021796 A1 | 2/2002 | Schessel |
| 2002/0052962 A1 | 5/2002 | Cherkasova et al. |
| 2002/0110091 A1* | 8/2002 | Rosborough et al. ......... 370/252 |
| 2003/0093433 A1 | 5/2003 | Seaman et al. |
| 2003/0158944 A1 | 8/2003 | Branson et al. |
| 2003/0206192 A1 | 11/2003 | Chen et al. |
| 2004/0015920 A1* | 1/2004 | Schmidt ...................... 717/153 |
| 2004/0049574 A1 | 3/2004 | Watson et al. |
| 2004/0133882 A1 | 7/2004 | Angel et al. |
| 2004/0193552 A1 | 9/2004 | Ikenaga et al. |
| 2004/0193612 A1 | 9/2004 | Chang |
| 2004/0199815 A1 | 10/2004 | Dinker et al. |
| 2004/0215768 A1 | 10/2004 | Oulu et al. |
| 2004/0230956 A1* | 11/2004 | Cirne et al. .................... 717/128 |
| 2005/0004952 A1 | 1/2005 | Suzuki et al. |
| 2005/0021736 A1 | 1/2005 | Carusi et al. |
| 2005/0071447 A1 | 3/2005 | Masek et al. |
| 2005/0210454 A1 | 9/2005 | DeWitt et al. |
| 2005/0235054 A1 | 10/2005 | Kadashevich |
| 2006/0015512 A1 | 1/2006 | Alon et al. |
| 2006/0059486 A1 | 3/2006 | Loh et al. |
| 2006/0075386 A1 | 4/2006 | Loh et al. |
| 2006/0130001 A1 | 6/2006 | Beuch et al. |
| 2006/0136920 A1 | 6/2006 | Nagano et al. |
| 2006/0143188 A1 | 6/2006 | Bright et al. |
| 2006/0155753 A1 | 7/2006 | Asher et al. |
| 2006/0291388 A1 | 12/2006 | Amdahl et al. |
| 2007/0038896 A1 | 2/2007 | Champlin et al. |
| 2007/0074150 A1 | 3/2007 | Jolfaei et al. |
| 2007/0124342 A1 | 5/2007 | Yamamoto et al. |
| 2007/0143290 A1 | 6/2007 | Fujimoto et al. |
| 2007/0150568 A1 | 6/2007 | Ruiz |
| 2007/0250600 A1 | 10/2007 | Freese et al. |
| 2007/0266148 A1 | 11/2007 | Ruiz et al. |
| 2008/0034417 A1 | 2/2008 | He et al. |
| 2008/0066068 A1 | 3/2008 | Felt et al. |
| 2008/0109684 A1 | 5/2008 | Addleman et al. |
| 2008/0134209 A1 | 6/2008 | Bansal et al. |
| 2008/0148240 A1 | 6/2008 | Jones et al. |
| 2008/0155089 A1* | 6/2008 | Hunt et al. .................... 709/224 |
| 2008/0163174 A1 | 7/2008 | Krauss |
| 2008/0172403 A1 | 7/2008 | Papatla et al. |
| 2008/0243865 A1 | 10/2008 | Hu et al. |
| 2008/0307441 A1 | 12/2008 | Kuiper et al. |
| 2009/0006116 A1 | 1/2009 | Baker et al. |
| 2009/0007072 A1 | 1/2009 | Singhal et al. |
| 2009/0007075 A1 | 1/2009 | Edmark et al. |
| 2009/0049429 A1 | 2/2009 | Greifeneder et al. |
| 2009/0064148 A1 | 3/2009 | Jaeck et al. |
| 2009/0106601 A1 | 4/2009 | Ngai et al. |
| 2009/0138881 A1 | 5/2009 | Anand et al. |
| 2009/0150908 A1 | 6/2009 | Shankaranarayanan et al. |
| 2009/0187791 A1 | 7/2009 | Dowling et al. |
| 2009/0193443 A1 | 7/2009 | Lakshmanan et al. |
| 2009/0210876 A1 | 8/2009 | Shen et al. |
| 2009/0216874 A1 | 8/2009 | Thain et al. |
| 2009/0241095 A1 | 9/2009 | Jones et al. |
| 2009/0287815 A1 | 11/2009 | Robbins et al. |
| 2009/0300405 A1 | 12/2009 | Little |
| 2009/0328180 A1 | 12/2009 | Coles et al. |
| 2010/0017583 A1 | 1/2010 | Kulper et al. |
| 2010/0088404 A1 | 4/2010 | Mani et al. |
| 2010/0094992 A1 | 4/2010 | Cherkasova et al. |
| 2010/0100774 A1 | 4/2010 | Ding et al. |
| 2010/0131931 A1 | 5/2010 | Musuvathi et al. |
| 2010/0131956 A1 | 5/2010 | Drepper |
| 2010/0138703 A1 | 6/2010 | Bansal et al. |
| 2010/0183007 A1 | 7/2010 | Zhao et al. |
| 2010/0257510 A1 | 10/2010 | Horley et al. |
| 2010/0262703 A1 | 10/2010 | Faynberg et al. |
| 2010/0268797 A1 | 10/2010 | Pyrik et al. |
| 2010/0312888 A1 | 12/2010 | Alon et al. |
| 2010/0318648 A1 | 12/2010 | Agrawal et al. |
| 2011/0016207 A1* | 1/2011 | Goulet et al. ................. 709/224 |
| 2011/0016328 A1 | 1/2011 | Qu et al. |
| 2011/0087722 A1 | 4/2011 | Clementi et al. |
| 2011/0088045 A1 | 4/2011 | Clementi et al. |
| 2011/0264790 A1 | 10/2011 | Haeuptle et al. |
| 2012/0117544 A1 | 5/2012 | Kakulamarri et al. |
| 2012/0191893 A1 | 7/2012 | Kulper et al. |
| 2012/0291113 A1 | 11/2012 | Zapata et al. |
| 2012/0297371 A1 | 11/2012 | Greifeneder et al. |
| 2014/0068067 A1 | 3/2014 | Bansal |
| 2014/0068068 A1 | 3/2014 | Bansal |
| 2014/0068069 A1 | 3/2014 | Bansal |

OTHER PUBLICATIONS

U.S. Appl. No. 13/189,360; Office Action mailed Mar. 26, 2014.
U.S. Appl. No. 13/189,360; Final Office Action mailed Aug. 19, 2013.
U.S. Appl. No. 13/189,360; Office Action mailed Jan. 31, 2013.

(56) References Cited

OTHER PUBLICATIONS

U.S. Appl. No. 14/071,503; Office Action mailed Feb. 3, 2014.
U.S. Appl. No. 14/071,523; Office Action mailed Feb. 12, 2014.
U.S. Appl. No. 14/071,525; Office Action mailed Jan. 15, 2014.
U.S. Appl. No. 14/071,503; Final Office Action mailed Aug. 28, 2014.
U.S. Appl. No. 14/071,523; Final Office Action mailed Aug. 29, 2014.
U.S. Appl. No. 14/071,525; Final Office Action mailed Aug. 1, 2014.
U.S. Appl. No. 14/690,254, filed Apr. 17, 2015, Jyoti Bansal, Conducting Diagnostic Session For Monitored Business Transactions.

* cited by examiner

Method Array

| Method ID A | A start time | (A end time) | Method ID B | B start time | (B end time) | Method ID C | C start time | C end time |
|---|---|---|---|---|---|---|---|---|

↑ Index Pointer     ↑ Block Pointer

AUTOMATIC CAPTURE OF DETAILED ANALYSIS INFORMATION FOR WEB APPLICATION OUTLIERS WITH VERY LOW OVERHEAD

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services the provide the web application. When a web application is distributed over several machines, tracking the performance of the web service can become impractical with large amounts of data collected from each machine.

When a distributed web application is not operating as expected, additional information regarding application performance can be used to evaluate the health of the application. Collecting the additional information can consume large amounts of resources and often requires significant time to determine how to collect the information.

It very difficult to collect information for specific methods that perform poorly. To collect and store information for each and every method of a web application would take up too many resources and degrade performance of the application. As a result, by the time a web application is detected to be performing poorly, it is too late to collect data regarding the performance of the instance that is performing poorly, and only subsequent methods can be monitored.

There is a need in the art for web service monitoring which may accurately and efficiently monitor the performance of distributed applications which provide a web service.

SUMMARY OF THE CLAIMED INVENTION

A system monitors a network or web application provided by one or more distributed applications and provides data for each and every method instance in an efficient low-cost manner. The web application may be provided by one or more web services each implemented as a virtual machine or one or more applications implemented on a virtual machine. Agents may be installed on one or more servers at an application level, virtual machine level, or other level. The agent may identify one or more hot spot methods based on current or past performance, functionality, content, or business relevancy. Based on learning techniques, efficient monitoring, and resource management, the present system may capture data for and provide analysis information for outliers of a web application with very low overhead.

DETAILED DESCRIPTION

Figure 1:
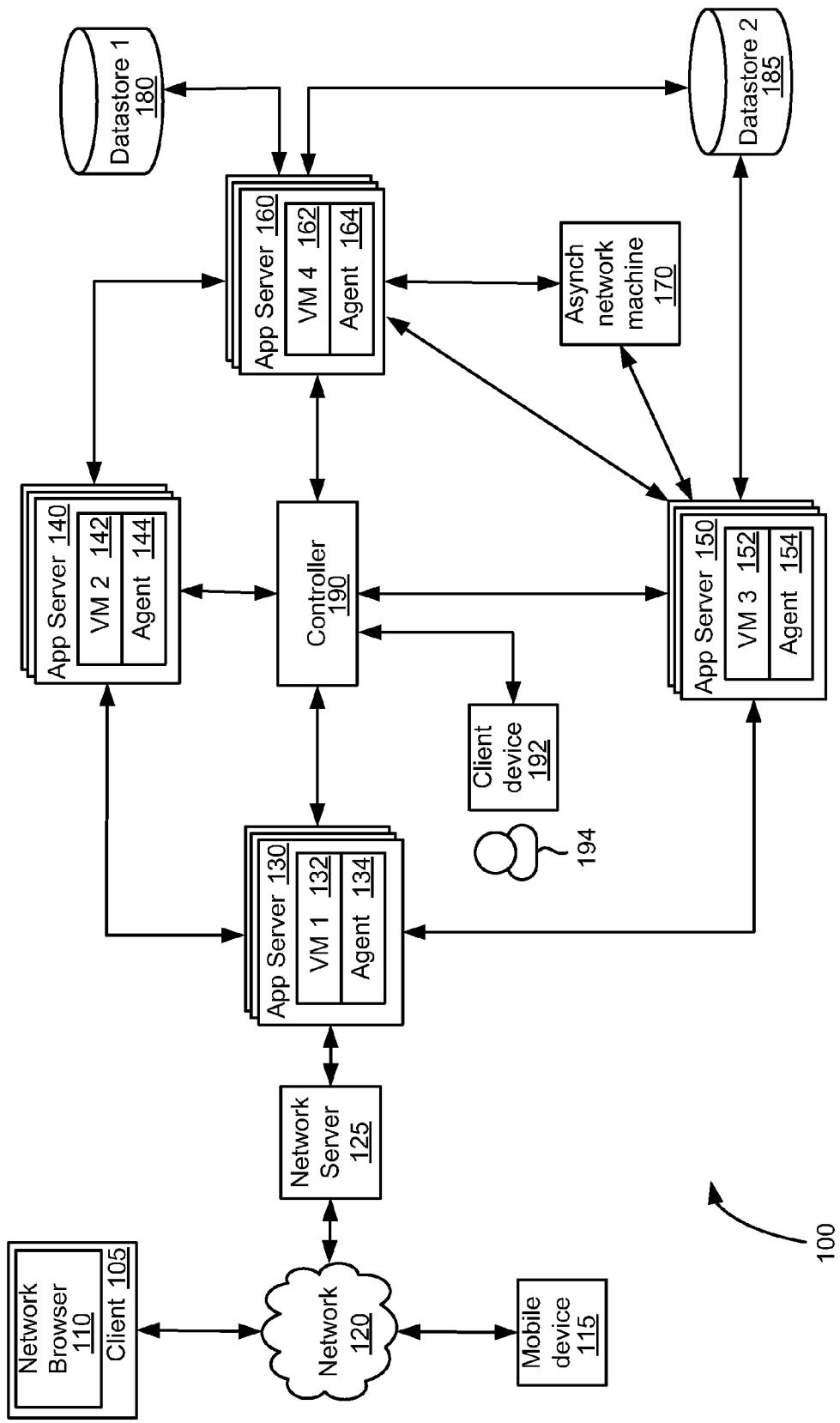
FIG. 1 is a block diagram of an exemplary system for monitoring a distributed application.

The present technology monitors a network or web application provided by one or more distributed applications and provides data for each and every method instance in an efficient low-cost manner. The web application may be provided by one or more web services each implemented as a virtual machine or one or more applications implemented on a virtual machine. Agents may be installed on one or more servers at an application level, virtual machine level, or other level. An agent may monitor a corresponding application (or virtual machine) and application communications. The agent may automatically identify one or more hot spot methods based on current or past performance, functionality, content, or business relevancy. The agent includes logic enabling it to automatically and dynamically learn the hot spot methods executing on a JVM. The hot spots are monitored, and data for the executed hot spot is kept or discarded based on the performance of the hot spot. Based on learning techniques, efficient monitoring, and resource management, the present system may capture data for and provide analysis information for outliers of a web application with very low overhead.

The hot spot monitoring may be performed by execution threads that manage method arrays of data. Each execution thread may manage one method array, and each method array may contain one block for each method that executes or is called by the executing method. Each block may include data used to analyze the method execution, such as for example a method ID, start time, end time. If a method called by an execution thread performs in a satisfactory manner, the data for the called method (method ID, start time, end time) is ignored and may be overwritten. If the method called by the execution thread (or the root method itself) does not perform in a satisfactory manner by for example exceeding a threshold time to complete, the data for the method is maintained and reported at the completion of the method. By monitoring method execution and call data in the thread header and ignoring data for methods that perform in a satisfactory manner, the present technology may monitor outliers for the duration of their execution in an efficient, low cost manner.

The present technology may perform a diagnostic session for an anomaly detected in the performance of a distributed web application. During the diagnostic session, detailed data may be collected for the operation of the distributed web application. The data may be processed to identify performance issues for a transaction. Detailed data for a distributed web application transaction may be collected by sampling one or more threads assigned to handle portions of the distributed business transaction. Data regarding the distributed transaction may be reported from one or more agents at an application or Java Virtual Machine (JVM) to one or more controllers. The data may be received and assembled by the one or more controllers into business transactions.

An anomaly in the performance of a distributed web transaction may be detected locally by an agent and centrally by a controller. An agent may locally detect an anomaly by processing collected runtime data for a request being processed by an application or JVM. The agent may determine baselines for request performance and compare the runtime data to the baselines to identify the anomaly. A controller may receive aggregated runtime data reported by the agents, process the runtime data, and determine an anomaly based on the processed runtime data that doesn't satisfy one or more parameters, thresholds or baselines.

The monitoring system may monitor distributed web applications across a variety of infrastructures. The system is easy to deploy and provides end-to-end business transaction visibility. The monitoring system may identify performance issues quickly and has a dynamical scaling capability across a monitored system. The present monitoring technology has a low footprint and may be used with cloud systems, virtual systems and physical infrastructures.

The present technology may monitor a distributed web application that performs one or more business transactions. A business transaction may be a set of tasks performed by one or more distributed web applications in the course of a service provide over a network. In an e-commerce service, a business transaction may be "add to cart" or "check-out" transactions performed by the distributed application.

Agents may communicate with code within virtual machine or an application. The code may detect when an application entry point is called and when an application exit point is called. An application entry point may include a call received by the application. An application exit point may include a call made by the application to another application, virtual machine, server, or some other entity. The code within the application may insert information into an outgoing call or request (exit point) and detect information contained in a received call or request (entry point). By monitoring incoming and outgoing calls and requests, and by monitoring the performance of a local application that processes the incoming and outgoing request, the present technology may determine the performance and structure of complicated and distributed business transactions.

FIG. 1 is a block diagram of an exemplary system for monitoring a distributed web application. The system of FIG. 1 may be used to implement a distributed web application and detect anomalies in the performance of the distributed web application. System 100 of FIG. 1 includes client device 105, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, or a combination of these networks.

Network server 125 is connected to network 120 and may receive and process requests received over network 120. Network server 125 may be implemented as one or more servers implementing a network service. When network 120 is the Internet, network server 125 maybe implemented as a web server.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at lease a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Figure 2:
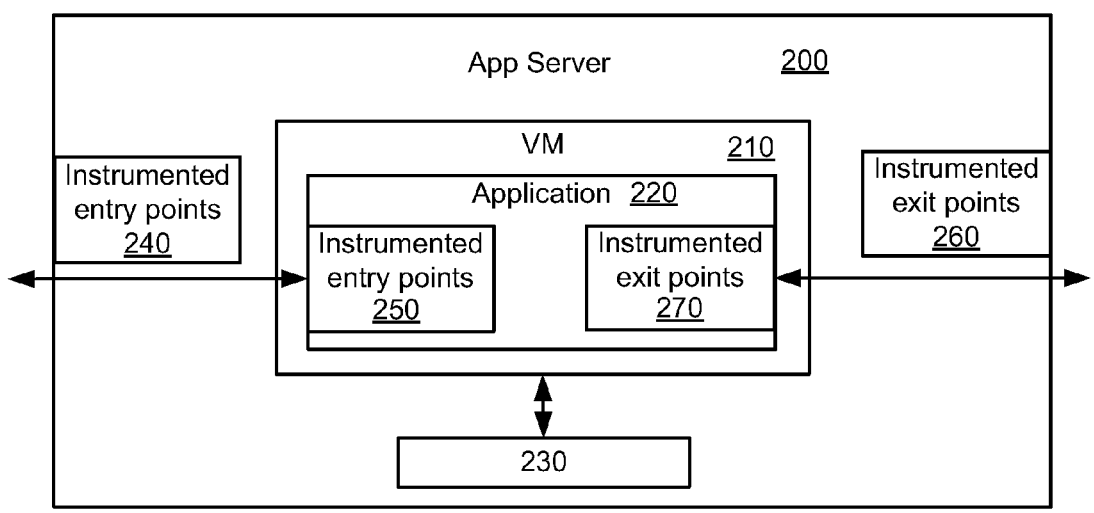
FIG. 2 is a block diagram of an exemplary application server.

FIG. 2 is a block diagram of an exemplary application server 200. The application server in FIG. 2 provides more information for each application server of system 100 in FIG. 1. Application server 200 of FIG. 2 includes a virtual machine 210, application 220 executing on the virtual machine, and agent 230. Virtual machine 210 may be implemented by programs and/or hardware. For example, virtual machine 134 may be implemented as a JAVA virtual machine. Application 220 may execute on virtual machine 210 and may implement at least a portion of a distributed application performed by application servers 130-160. Application server 200, virtual machine 210 and agent 230 may be used to implement any application server, virtual machine and agent of a system such as that illustrated in FIG. 1.

Application server 200 and application 220 can be instrumented via byte code instrumentation at exit and entry points. An entry point may be a method or module that accepts a call to application 220, virtual machine 210, or application server 200. An exit point is a module or program that makes a call to another application or application server. As illustrated in FIG. 2, an application server 200 can have byte code instrumented entry points 240 and byte code instrumented exit points 260. Similarly, an application 220 can have byte code instrumentation entry points 250 and byte code instrumentation exit points 270. For example, the exit points may include calls to JDBC, JMS, HTTP, SOAP, and RMI. Instrumented entry points may receive calls associated with these protocols as well.

Agent 230 may be one or more programs that receive information from an entry point or exit point. Agent 230 may process the received information, may retrieve, modify and remove information associated with a thread, may access, retrieve and modify information for a sent or received call, and may communicate with a controller 190. Agent 230 may be implemented outside virtual machine 210, within virtual machine 210, and within application 220, or a combination of these.

Figure 3:
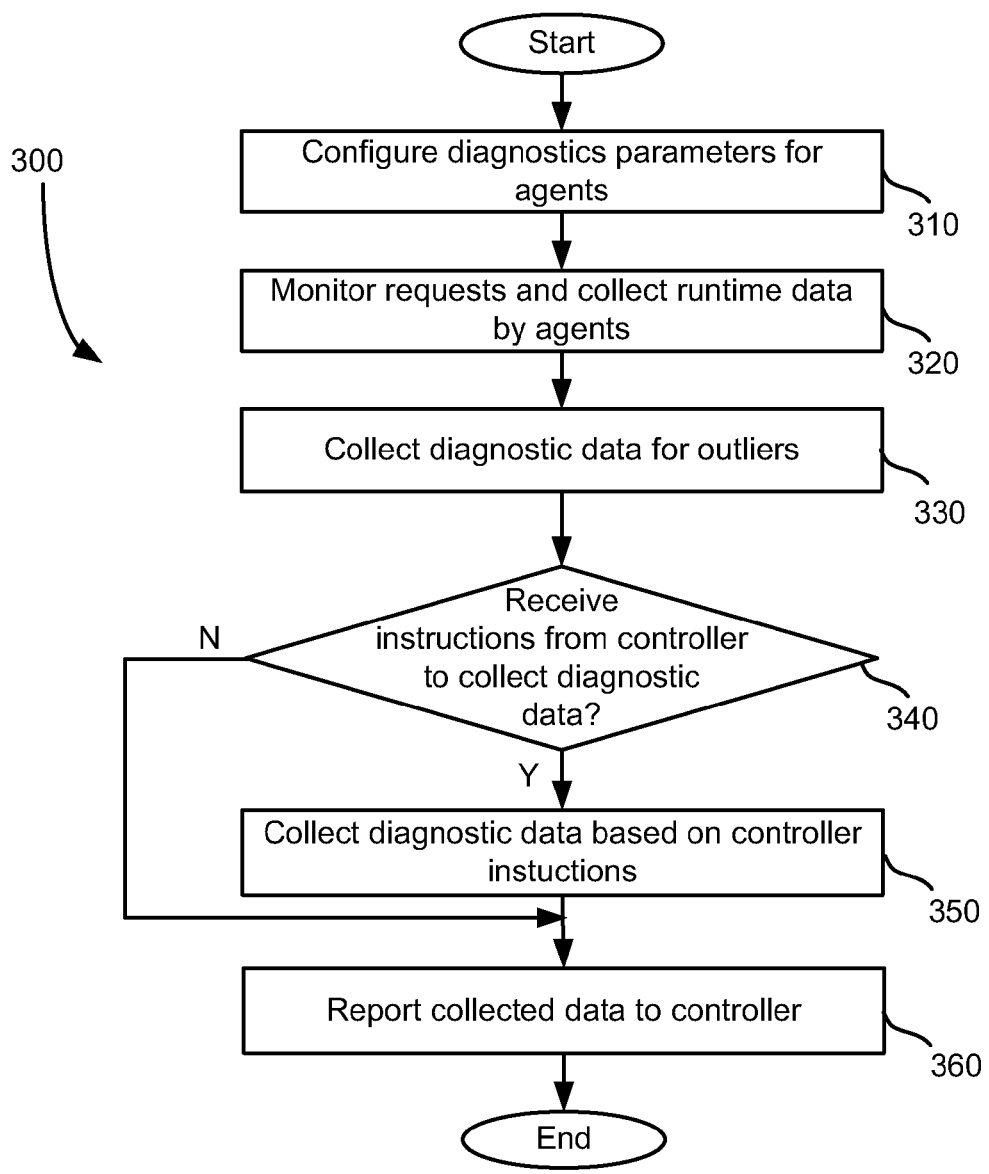
FIG. 3 is a flow chart of an exemplary method for performing a diagnostic session for a distributed web application transaction.

FIG. 3 is a flow chart of an exemplary method for performing a diagnostic session for a distributed web application transaction. The method of FIG. 3 may be performed to a web transaction that is performed over a distributed system, such as the system of FIG. 1.

Diagnostic parameters may be configured for a controller and one or more agents at step 310. The diagnostic parameters may be used to implement a diagnostic session conducted for a distributed web application business transaction. The parameters may be set by a user, an administrator, may be pre-set, or may be permanently configured.

Examples of diagnostic parameters that may be configured include the number of transactions to simultaneously track using diagnostic sessions, the time of a diagnostic session, a sampling rate for a thread, and a threshold percent of requests detected to run slow before triggering an anomaly. The number of transactions to simultaneously track using diagnostic sessions may indicate the number of diagnostic sessions that may be ongoing at any one time. For example, a parameter may indicate that only 10 different diagnostic sessions can be performed at any one time. The time of a diagnostic session may indicate the time for which a diagnostic session will collect detailed data for operation of a transaction, such as for example, five minutes. The sampling rate of a thread may be automatically set to a sampling rate to collect data from a thread call stack based on a detected change in value of the thread, may be manually configured, or otherwise set. The threshold percent of requests detected to run slow before triggering an anomaly may indicate a number of requests to be detected that run at less than a baseline threshold before triggering a diagnostic session. Diagnostic parameters may be set at either a controller level or an individual agent level, and may affect diagnostic tracking operation at both a controller and/or an agent.

Requests may be monitored and runtime data may be collected at step 320. As requests are received by an application and/or JVM, the requests are associated with a business transaction by an agent residing on the application or JVM, and may be assigned a thread within a thread pool by the application or JVM itself. The business transaction is associated with the thread by adding business transaction information, such as a business transaction identifier, to the thread by an agent associated with the application or JVM that receives the request. The thread may be configured with additional monitoring parameter information associated with a business transaction. Monitoring information may be passed on to subsequent called applications and JVMs that perform portions of the distributed transaction as the request is monitored by the present technology.

Diagnostic data may be collected for outliers at step 330. Outlier data may be collected for an entire business transaction. The system may learn about the methods performed on a JVM, identify hot spot methods to monitor, capture data for the identified hot spot methods, and process the hot spot data. Hot spot methods are monitored in a very efficient and low cost manner, creating very little overhead and using few resources on JVMs being monitored. Tracking hot spot methods as part of collecting diagnostic data for outliers is discussed in more detail below with respect to the method of FIG. 4.

A determination is made as to whether instructions have been received from a controller to collect diagnostic data at step 350. A diagnostic session may be triggered "centrally" by a controller based on runtime data received by the controller from one or more agents located throughout a distributed system being monitored. If a controller determines that an anomaly is associated with a business transaction, or portion of a business transaction for which data has been reported to the controller, the controller may trigger a diagnostic session and instruct one or more agents residing on applications or JVMs that handle the business transaction to conduct a diagnostic session for the distributed business transaction. Operation of a controller is discussed in more detail below with respect to the method of FIG. 9.

If no instructions are received from a controller to collect diagnostic data, the method of FIG. 3 continues to step 370. If instructions are received to collect diagnostic data from a controller, diagnostic data is collected based on the controller instructions at step 360. The agent may collect data for the remainder of the current instance of a distributed application as well as subsequent instances of the request. Collecting diagnostic data based on instructions received by a controller is described below with respect to the method of FIG. 5. Next, data collected by a particular agent is reported to a controller at step 370. Each agent in a distributed system may aggregate collected data and send data to a controller. The data may include business transaction name information, call chain information, the sequence of a distributed transaction, and other data, including diagnostic data collected as part of a diagnostic session involving one or more agents.

Figure 4:
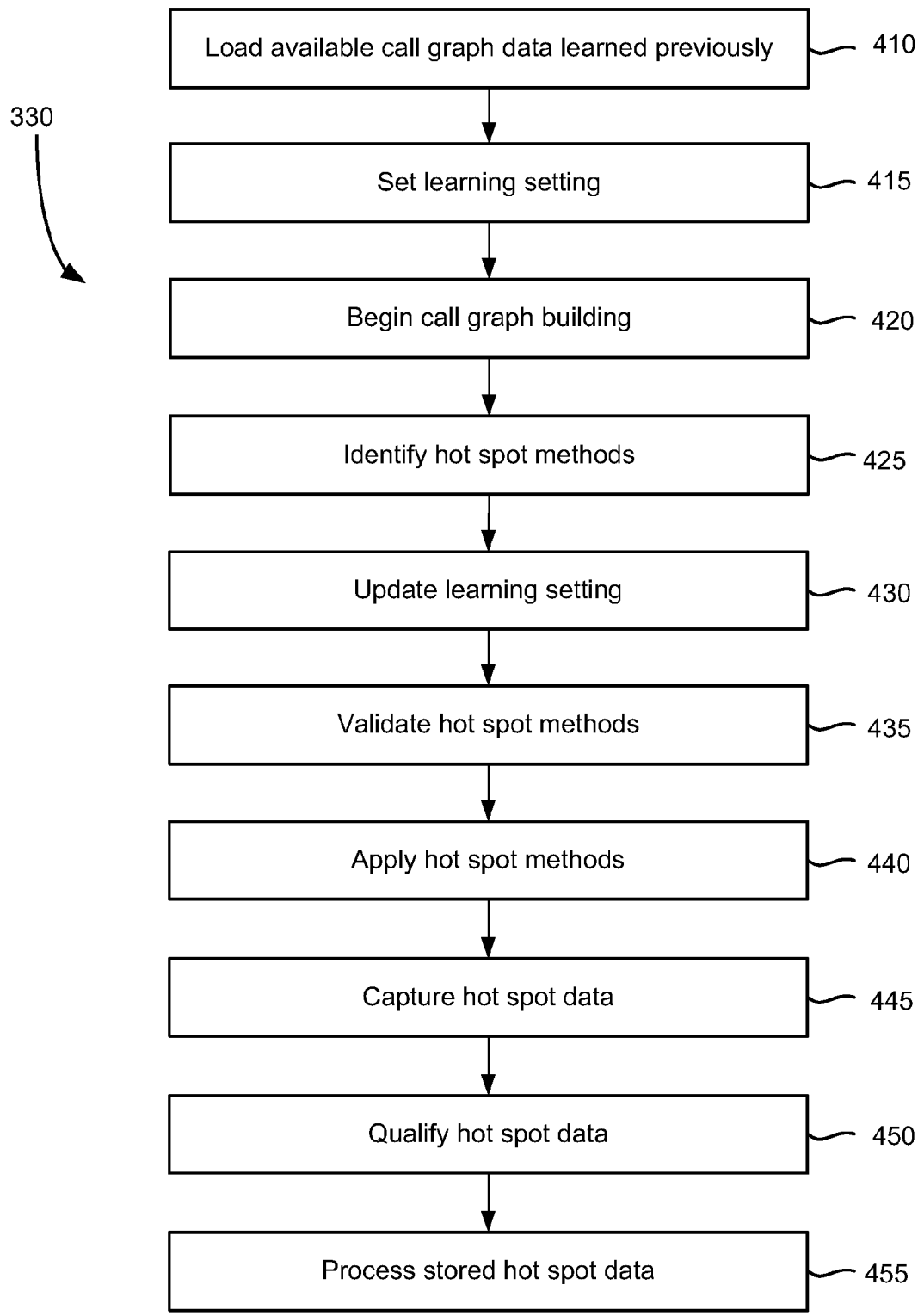
FIG. 4 is a flow chart of an exemplary method for tracking hot spot method data.

FIG. 4 is a flow chart of an exemplary method for tracking hot spot method data. The method of FIG. 4 provides more detail for step 330 of the method of FIG. 3. Each step of FIG. 4 may be performed automatically by an agent (such as that illustrated in FIG. 1) and/or other modules. Available call graph data learned previously may be loaded by an agent at the JVM at step 410. In some embodiments, the agent may monitor one or more business transactions occurring at JVM to determine the methods and relationships between methods that make up the business transaction. As the business transaction methods are learned, they may be stored. When an agent beings monitoring hot spot methods at a later time, the learned methods and method relationships may be pre-loaded to prevent having to re-learn the business transaction(s) methods and method relationships again.

A learning setting may be set at step 415. The learning setting may indicate for how long an agent will attempt to learn the different methods of a business transaction, how many methods the agent will attempt to identify, and other parameters of determining a call graph for one or more business transactions. Learning settings may include time, preferred business transactions, maximum number of business transactions, length of time to hibernate between learning sessions, and other parameters. When in "learning mode", an agent monitoring a JVM may identify each new method called during a learning period, and relationships of each method with any other method. When in "hibernate mode", an agent may not identify new methods or method relationships.

Learning of business transaction methods and method relationships may be ongoing. Though learning settings are set at step 415, the settings may be changed at any time. Moreover, learning may occur as a continuous loop. Learning and hibernation may alternate based on time periods, rate of new methods learned, and other factors. For example, an agent may learn for five minutes upon execution of a JVM application, then hibernate for five minutes, and then "learn" methods and method relationships for another five minutes. In some embodiments, an agent may "learn" until no new methods are identified for a period of thirty seconds, and then hibernate for five minutes.

A call graph may be built at step 420. After learning settings are initially set, an agent may monitor a JVM and build a call graph from the learned data. In some embodiments, the call graph may be built from the pre-loaded call graph data, method data observed while monitoring, or both. A call graph may indicate a root method of a business transaction, as well as each method called as part of the completion of the root method. Examples of call graphs are discussed in U.S. patent application Ser. No. 12/878,919, titled "Monitoring Distributed Web Application Transactions", filed on Sep. 9, 2010, and U.S. patent application Ser. No. 13/189,360, titled "Automatic Capture of Diagnostic Data Based on Transaction Behavior Learning", filed on Jul. 22, 2011, the disclosures of which are each incorporated herein by reference.

Hot spot methods are identified at step 425. Hot spot methods are methods identified as being subject to monitoring. For example, a method may be identified as a hot spot method based on calls the method makes, complexity, or the method's performance. Identifying hot spot methods is discussed in more detail with respect to the method of FIG. 5.

Learning settings may be updated at step 430. As discussed above, learning may be an ongoing process. As part of the ongoing process, learning settings may be adjusted over time. For example, after hot spot methods are identified, an agent at a JVM may update learning settings to adjust the time spent learning new methods of a call graph. Though updating learning settings is illustrated at step 430, learning settings may be updated at any time throughout the method of FIG. 4.

Hot spot methods may be validated at step 435. Validation of hot spot methods may include monitoring a JVM to confirm that the identified hot spot methods should indeed be labeled hot spot methods. For example, the validation may confirm that a method typically takes longer than a threshold time period to complete, that a method places a call to an outside database, or another condition typically occurs for each method that was identified as a hot spot method at step 425.

Hot spot methods are applied at step 440. Applying hot spot methods may include instrumenting the byte code of each method to store the start time and end time of the method. The instrumentation may also include a location reference within a method array for storing data, such as an end time for the method that is instrumented. An exemplary pseudo code for the instrumentation is shown below:

```
{
Start.onMethodBegin
    (Original method code)
    (Original method code)
    ...
    (Original method code)
OnMethodEnd (9, A, B)
}
```

The original code of a hot spot method is instrumented such that when the method is called, the method ID and the start time of the method is written to the execution thread header for the thread executing the method. When the method ends, the end time is written to the thread header. The method ID, start time and end time may be written to a method array that is maintained in the execution thread.

Hot spot data may be captured at step 445. Capturing hot spot data may include monitoring executing hot spot methods, tracking calls to additional methods and external machines, and keeping data that is relevant to outliers. Data that is not relevant to outliers, such as data for methods that perform well, may not be kept. Capturing hot spot data is discussed in more detail below with respect to FIG. 6.

Hot spot data may be qualified at step 450. Qualifying hot spot data may include determining which data to store and what data to not store. Qualifying hot spot data is discussed in more detail below with respect to FIG. 7.

Hot spot data may be processed at step 455. Processing of hot spot data may include building a call graph and presenting call graph information to a user. The call graph data may be presented as a graphical interface or in some other form. The call graph may be constructed from captured hot spot data which is stored until the call graph is requested by a user. Processing hot spot data is discussed in more detail below with respect to the method of FIG. 8.

Figure 5:
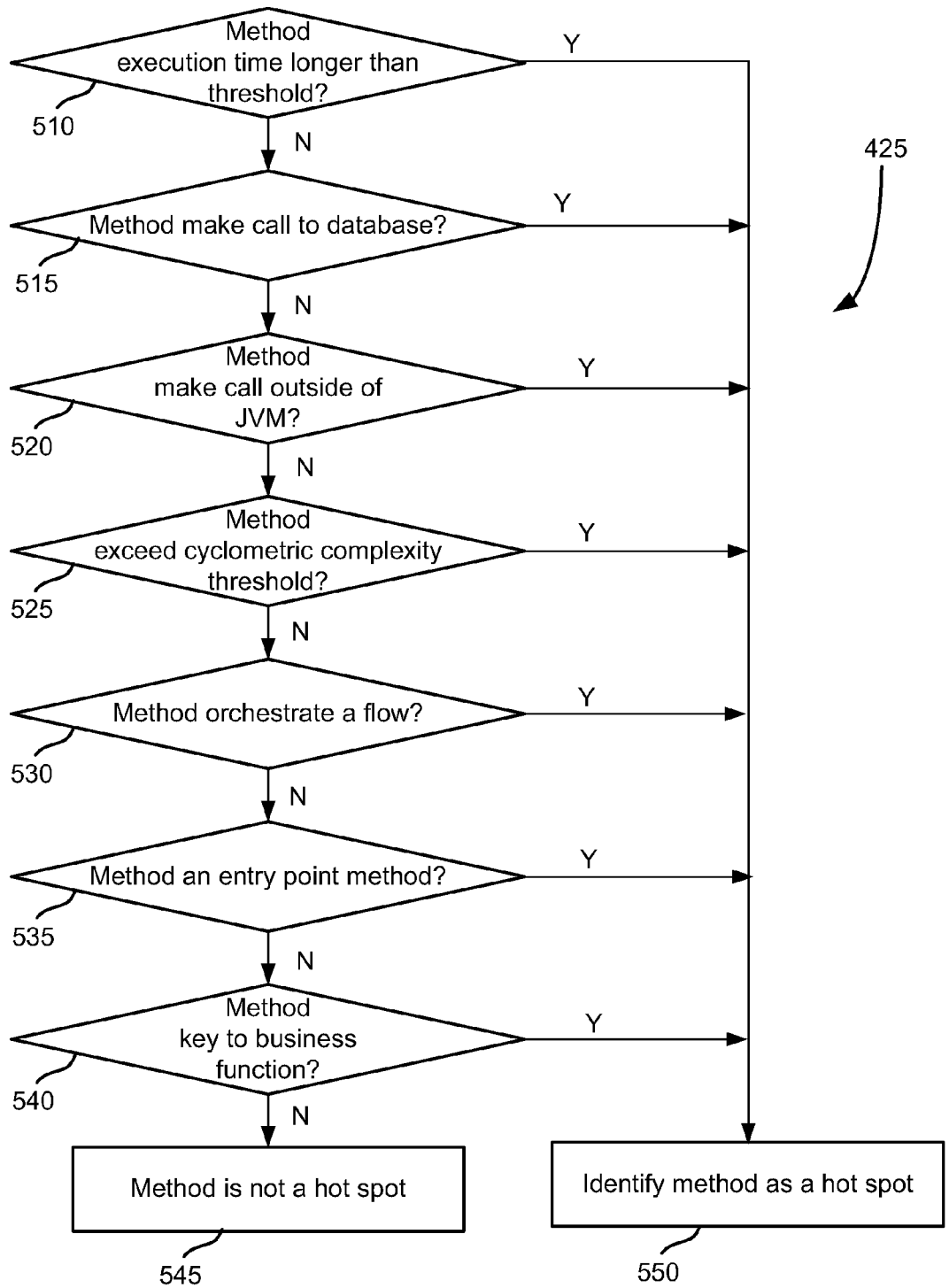
FIG. 5 is a flow chart of an exemplary method for identifying hot spot methods.

FIG. 5 is a flow chart of an exemplary method for identifying hot spot methods. The method of FIG. 5 provides more detail for step 425 of the method of FIG. 4. A determination is made as to whether the execution time of the method was longer than a threshold. The threshold may be a preset setting or may be learned over time (e.g., as an average of previous method execution times). If the method execution time is longer than the execution time threshold, the method is identified as a hot spot at step 550. If the method does not execute for a time longer than the execution threshold, the method continues to step 515.

A determination is made as to whether the method made a call to a database at step 515. In some embodiments, a method that makes a call to a specific application server, such as a database, may be identified as a hot spot method. If the method does not make a call to a database, the method may continue to step 520. If the method does make a call to a database, the method is identified as a hot spot at step 550.

At step 520, a method is identified as a hot spot method (step 550) if the method makes a call to an external JVM. If the method does not make a call to an external JVM, the method continues to step 525.

At step 525, a method may be identified as a hot spot method if the method exceeds a cyclometric complexity threshold. A cyclometric complexity threshold is one measure for expressing the complexity of a method. Thresholds relating to other measures of method complexity may also be used in place of, or in addition to, cyclometric complexity. If the method cyclometric complexity exceeds a cyclometric complexity threshold, the method is identified as a hot spot at step 550. Otherwise, the method of FIG. 5 continues to step 530.

A determination is made as to whether the method orchestrates a flow at step 530. A method may orchestrate a flow if the method makes calls to one or more other methods, which in turn may make calls to one or more additional methods, and so forth. In various embodiments, the root method may be determined to "orchestrate" a flow if at least a threshold number of children and grandchildren methods are called directly or indirectly from the root method. If the method orchestrates a flow, the method is identified as a hot spot at step 550. Otherwise, the method continues to step 535.

A method may be identified as a hot spot method if is determined to be an entry point method for the JVM at step 535. If the hot spot method is not an entry point method, a determination is made as to whether the method is important to a business function at step 540. For example, for an e-commerce site, a method that processes credit card information may be considered a key business function and, therefore, a hot spot method. If the method does not satisfy any condition described in steps 510-540, the method is determined to not be a hot spot at step 545. If the method satisfies any condition described in steps 510-540, the method is identified as a hot spot at step 550.

Figure 6:
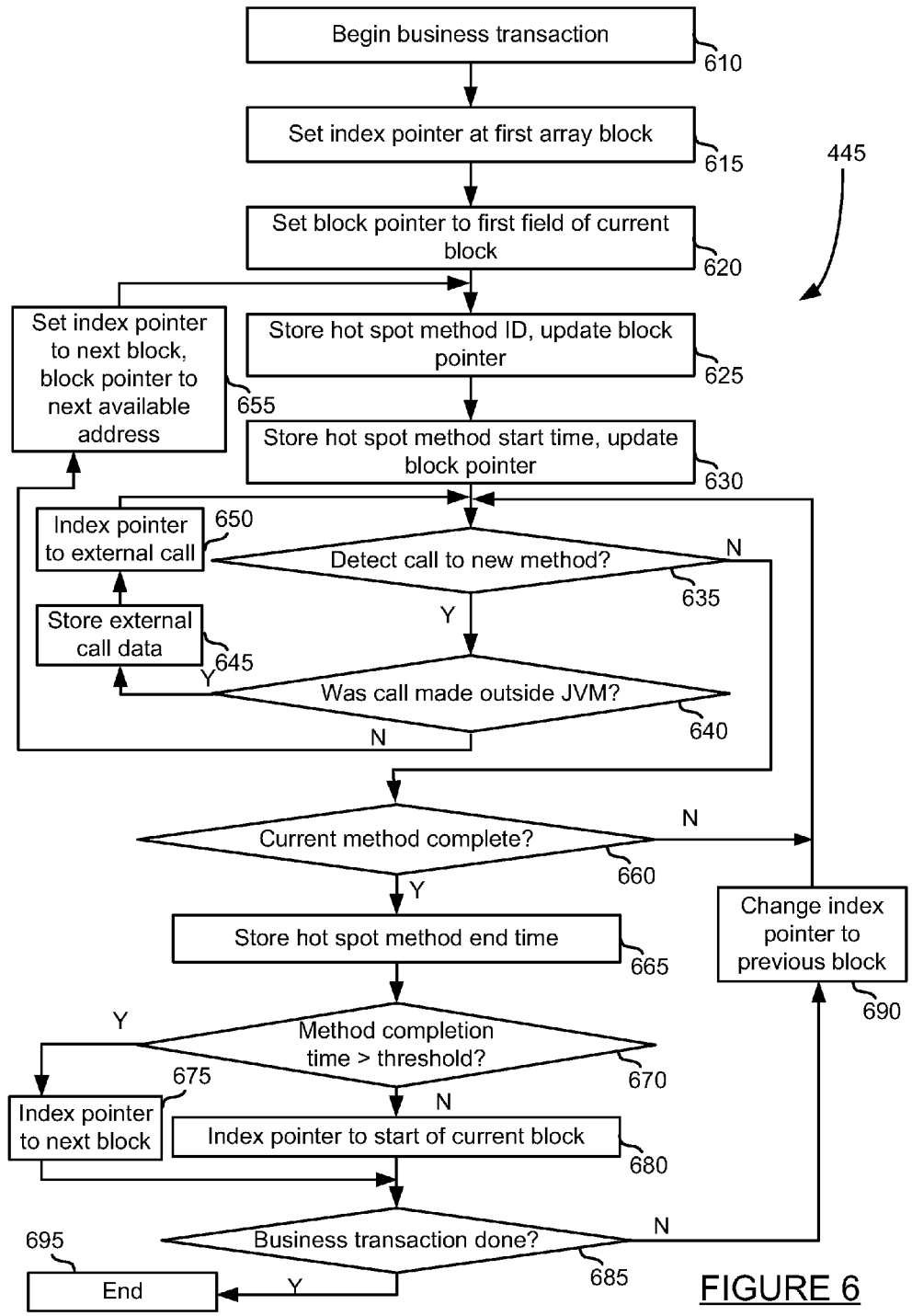
FIG. 6 is a flow chart of an exemplary method for capturing hot spot data.

FIG. 6 is a flow chart of an exemplary method for capturing hot spot data. The method of FIG. 6 provides more detail for step 445 of the method of FIG. 4. The method of FIG. 6 uses pointers and a method array stored in an execution thread header to track data for hot spot methods in a low cost manner.

A business transaction begins at step 610. An index pointer is set to the first array of a block within the method array at step 615. The array includes a block for each method called during execution of the root node of the method, with the first block associated with the root method. A block pointer is set to the first filed of the current block at step 620. A hot spot method ID associated with the currently executing method is stored at the current block and field within the method array at step 625, and the block pointer value is updated to point to the next field in the array. The hot spot method start time is then stored at the current block and field within the method array at step 630, and the block pointer value is updated to point to the next field in the array.

The performance of a method may be determined by execution time or response time. The execution time is determined from the difference of the start time and the end time of the method's execution. The time may be taken from one of several different times, including but not limited to the JVM clock, a server clock, a block clock, or other clock time.

A determination is made as to whether a call to a new method is detected at step 635. During execution of the current method, the method may call a new method to perform some function. If a call to a new method is not detected at step 635, the method continues to step 660.

If a call to a new method is detected at step 635, a determination is made as to whether the call was made to an outside JVM at step 640. If the call is made to an outside JVM, external call data is stored for the call at step 645 and the index pointer is set to the external call at step 650. The method then continues to step 635. If the call is not made to an external JVM, the index pointer is set to the next available block, the block pointer is set to the next available address, and the method continues to step 625.

External call data may be stored in one of several formats, including a list or table format. For example, a table of external calls may be stored as a list of the external methods called and an identifier of the method that called the external call. The identifier may by a method array location corresponding to the method ID, a reference to the block associated with the method (i.e., block 1 corresponding to a root node method), or other identifier. If data for the method is eventually stored, the list (or table) of external call information is stored with the method array data.

A determination is made as to whether the current method is complete at step 660. If the current method is still executing, the method returns to step 635. When execution of the current method has completed, the hot spot method end time is written to the method array in the execution thread header at step 665. In some embodiments, the end time is written to an address location specified by the instrumented code.

A determination is then made as to whether the method completion time is greater than a threshold value at step 670. The threshold may be a pre-set value or learned over time for the particular method, class of method, business transaction, or related business transactions. In various embodiments, the threshold time may be 10 ms, 15 ms, 20 ms, or some other value. If the method execution time was greater than the threshold value, the index pointer is set to the next block (or next available block). By setting the index pointer to the next block location, the data for the method which just ended is saved. IF the method execution time is less than the threshold value, the index pointer is set to the start of the current block.

By setting the index pointer to the start of the current block, the data for the current block will be overwritten (and not saved).

A determination is then made as to whether the current business transaction has completed with the end of the current method. If the business transaction is complete, the method ends at step 695. If the business transaction is not complete, the index pointer is set to the previous block and the method continues to step 635.

Figure 7:
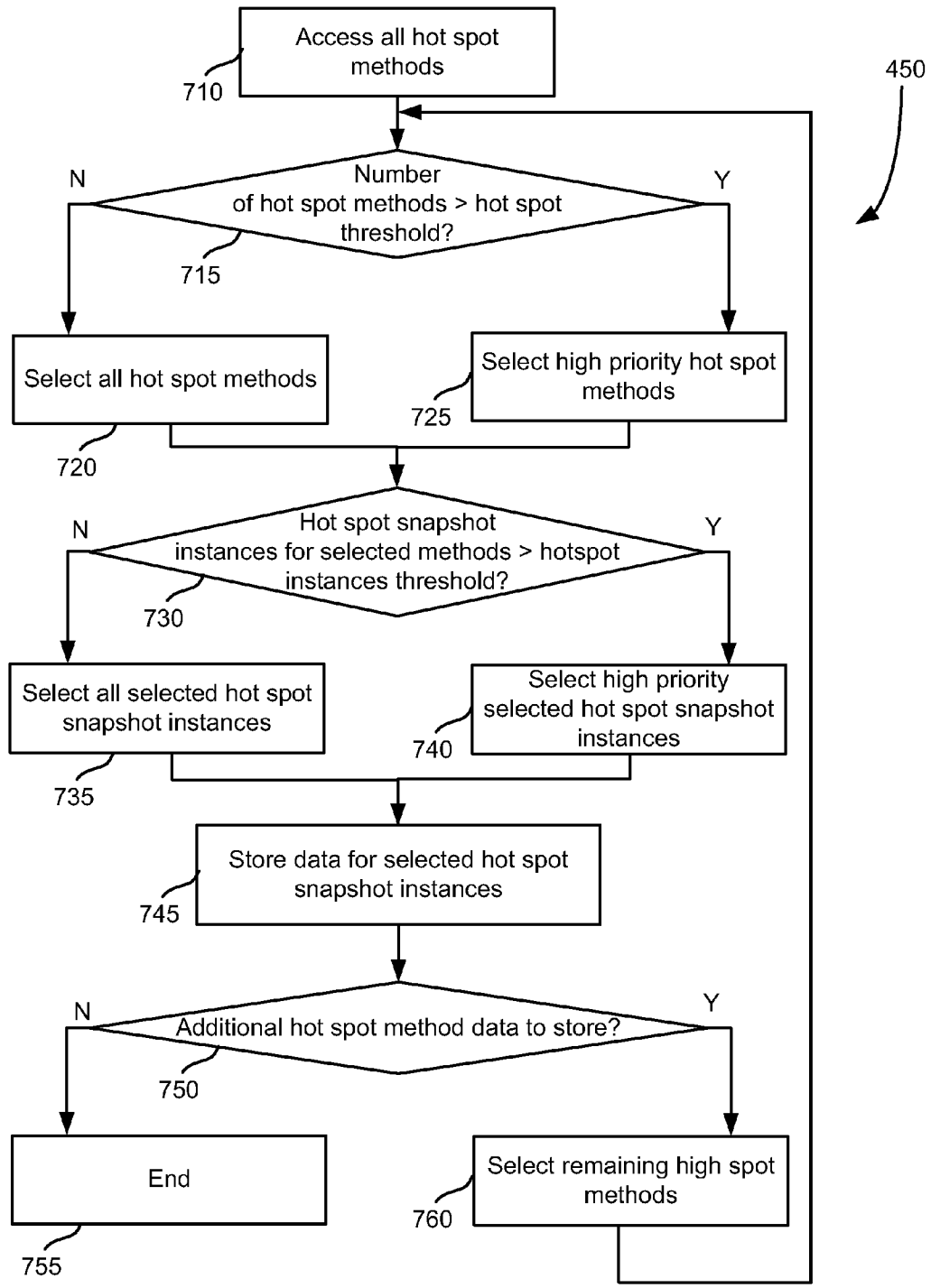
FIG. 7 is a flow chart of an exemplary method for qualifying hot spot data.

FIG. 7 is a flow chart of an exemplary method for qualifying hot spot data. The method of FIG. 7 provides more detail for step 450 of the method of FIG. 4. Hot spot methods are accessed at step 710. A determination is then made as to whether the number of hot spot methods is greater than a hot spot threshold at step 715. The hot spot threshold may be based on several factors, including the number of available threads that are available for storing data. If the number of methods is greater than the threshold, a set of high priority hot spots are selected at step 725 and the method continues to step 730. Methods of high priority may be those that satisfy several conditions described with respect to the method of FIG. 5. For example, a method that executes slower than a threshold time and calls an external JVM may have a higher priority than a method that executes slower than a threshold time and does not call an external JVM. If the number of hot spots does not exceed a hot spot threshold, all hot spots are selected at step 720 and the method continues to step 730.

A determination is made as to whether the number of hot spot snapshot instances is greater than a hot spot instance threshold at step 730. A hot spot snapshot instance is a set of data resulting from the execution of a method instance. An instance of a method may be executed one or more times. A hot spot snapshot instance is a "snapshot" or set of the data generated from the execution of the instance. The hot spot instance threshold may be selected to avoid an undesirable level of overhead or resource usage at the JVM. For example, a hot spot instance threshold of 20 may be used if it is determined that storing hot spot data for twenty method instances does not cause a noticeable performance delay in the JVM. If the number of hot spot snapshot instances is not greater than the hot spot instance threshold, all snapshot instances are selected at step 735 and the method continues to step 745. If the number of hot spot snapshot instances is greater than the hot spot instance threshold, a number of high priority hot spot snapshot instances of the selected hot spot methods are selected at step 740 and the method continues to step 745. Hot spot snapshot instances may be designated as high priority based on one or more factors, including for example the length of execution time, the number of conditions discussed with reference to FIG. 5 which are violated by the method class, and other factors.

Data for the selected hot spot snapshot instances is stored at step 745. The data may be stored by an agent locally to the agent's JVM until data is reported to a controller. The stored data may include the method array written to the thread header during execution of the methods as well as external call data, such as a list of external calls made by the methods being monitored.

A determination is then made as to whether there is additional hot spot method data to store at step 750. If there is no further hot spot method data, the method ends at step 755. If there is additional hot spot method data, the remaining hot spot methods are selected and the method continues to step 715.

Figure 8:
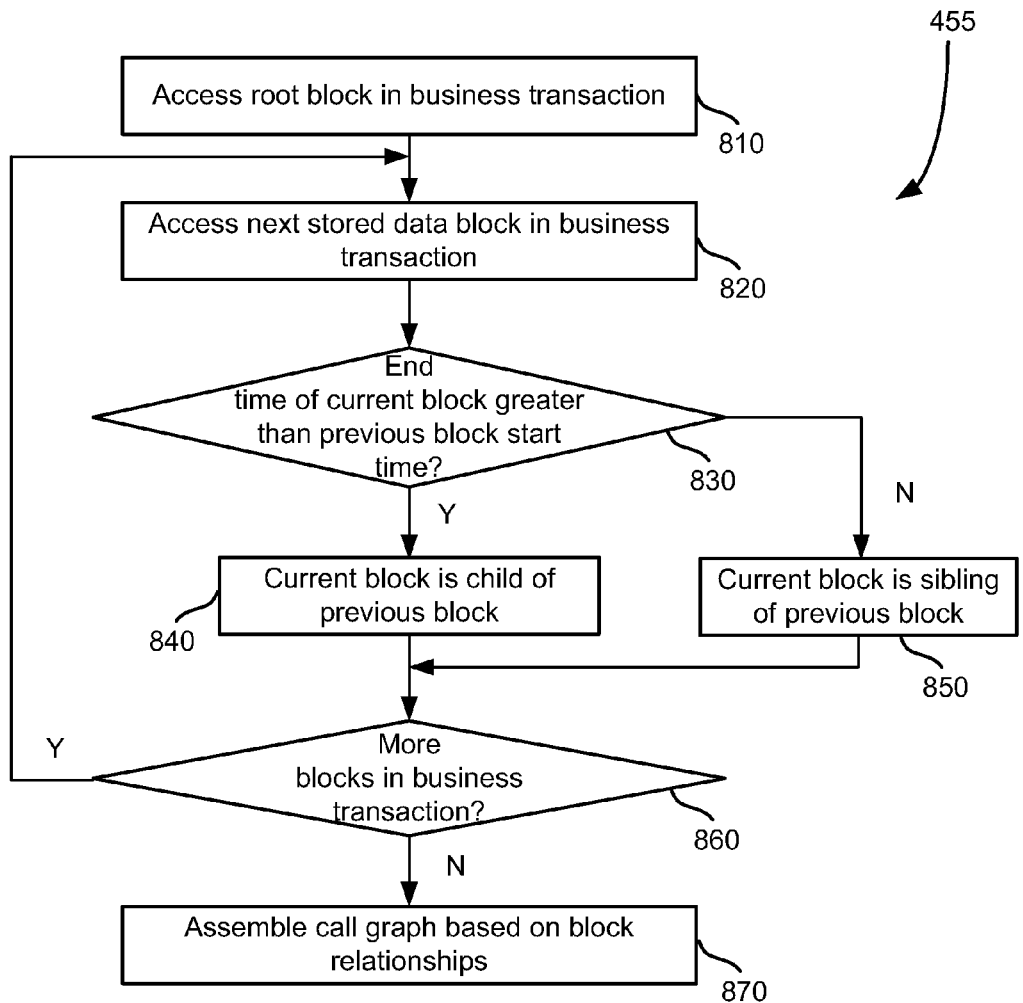
FIG. 8 is a flow chart of an exemplary method for processing stored hot spot data.

FIG. 8 is a flow chart of an exemplary method for processing stored hot spot data. The method of FIG. 8 provides more detail for step 455 of the method of FIG. 4. A root block is accessed in a business transaction at step 810. The next stored data block in the business transaction is accessed at step 820. A determination is then made as to whether the end time of the current block is greater than the start time of the previous block at step 830. The determination is designed to indicate whether the current block is a sibling or a child of the previous block. Other comparisons may be made to determine the relationship between the methods associated with the current block and the previous block. If the current block end time is not greater than the start time of the previous block, the current block is determined to be a sibling of the previous block (step 850) and the method continues to step 860. If the current block end time is greater than the start time of the previous block, the current block is determined to be a child of the previous block (step 840) and the method continues to step 860.

A determination is made as to whether more blocks exist in the method array to process at step 860. If more blocks exist, the method continues to step 820. If the blocks don't exist, the call graph is assembled based on block relationships and provided to a user at step 870.

Figures 9A, 9B:
FIG. 9A is a block diagram of illustrating method calling hierarchy.
FIG. 9B is a block diagram of a method array.

FIG. 9A is a block diagram of illustrating method calling hierarchy. As illustrated in FIG. 9A, methods A, B and C are identified as hot spot methods. Hot spot A makes a call to method B, and method B may call method C. Method C is a child of method B, and method B is a child of method A.

FIG. 9B is a block diagram of a method array. The array of FIG. 9B illustrates blocks pertaining to methods A, B and C of FIG. 9A. Each block includes a method ID, start time, and end time field for the method corresponding to the block. An index pointer is set to the currently executing block location within the array, and the block pointer is set to a location within the current block.

Figure 10:
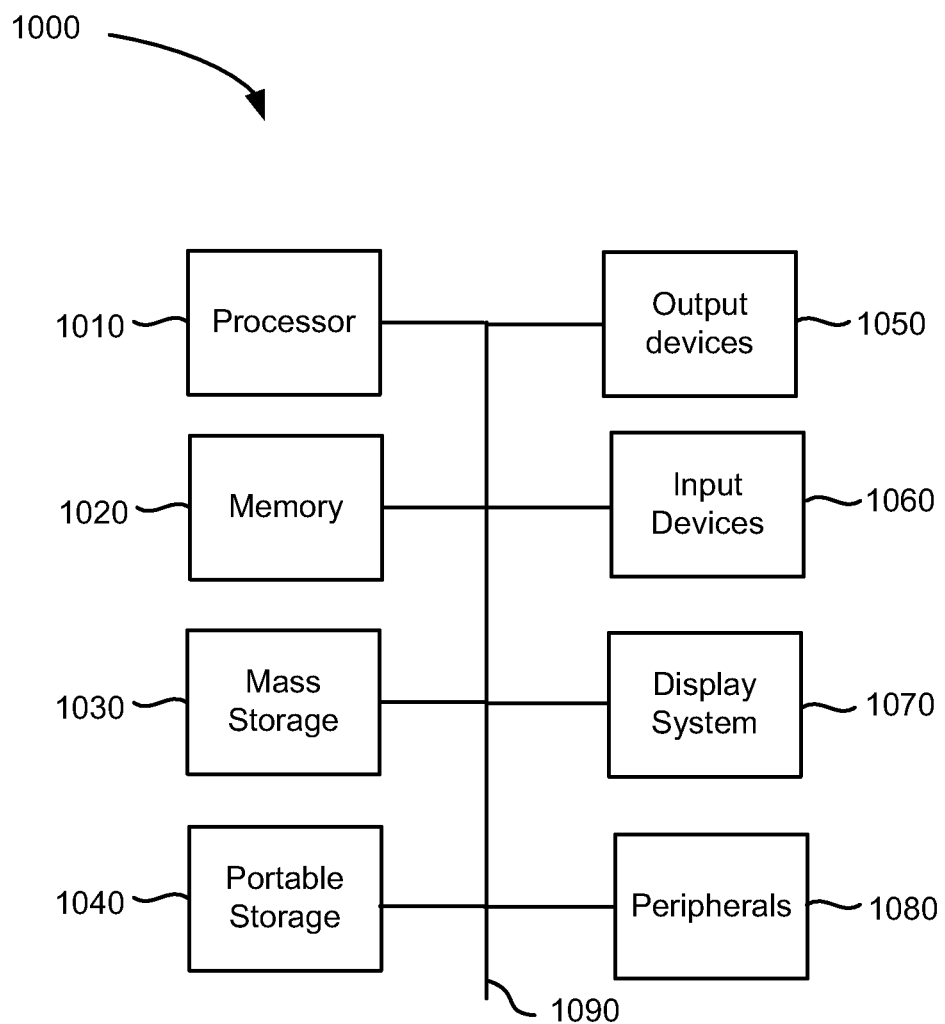
FIG. 10 is a block diagram of an exemplary system for implementing a computing device.

FIG. 10 illustrates an exemplary computing system 1000 that may be used to implement a computing device for use with the present technology. System 1000 of FIG. 10 may be implemented in the contexts of the likes of clients 105-115, network server 125, application servers 130-160, machine 170, datastores 180-185, and controller 190. The computing system 1000 of FIG. 10 includes one or more processors 1010 and memory 1010. Main memory 1010 stores, in part, instructions and data for execution by processor 1010. Main memory 1010 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1010 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1010.

Portable storage device 1040 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a business transaction, comprising:
    recording performance data for each of a plurality of methods of a network application, the performance data stored by an agent in a header of an execution thread that executes the method, the agent stored on a machine that executes the plurality of methods;
    ignoring the performance data for one or more of the plurality of methods that satisfy a threshold;
    generating a call graph from the performance data, the call graph indicating the root method of the business transaction and each method called as part of completion of the business transaction; and
    storing the performance data for one or more of the plurality of methods having a root node that does not satisfy a condition.

2. The method of claim 1, wherein the performance data includes a start time and an end time for execution of the method.

3. The method of claim 1, wherein the condition includes a threshold for time of execution.

4. The method of claim 1, wherein the condition includes calling an external Java Virtual Machine.

5. The method of claim 1, wherein storing the data includes storing execution data and external call data.

6. The method of claim 1, wherein the performance data is stored in an array within the execution thread header.

7. The method of claim 1, further comprising:
    building a call graph for a Java Virtual Machine; and
    identifying methods within the call graph that do not satisfy the condition.

8. The method of claim 1, further comprising:
    qualifying the methods associated with the stored data;
    storing a portion of the stored data based on the qualification of the methods.

9. The method of claim 1, further comprising processing a stored hot spot data to generate a graphical representation of the methods.

10. The method of claim 1, further comprising:
    automatically identifying one of the plurality of methods executed as part of a business transaction as part of a learning process; and
    recording performance data for each of a plurality of methods associated with the business transaction.

11. The method of claim 10, wherein automatically identifying includes pre-loading previously stored methods associated with the business transaction.

12. The method of claim 11, further comprising ending the learning process based on a number of times that automatically identifying is performed.

13. The method of claim 12, further comprising re-starting the learning process after a period of time.

14. A non-transitory computer-readable storage medium having embodied thereon a program, the program being executable by a processor to perform a method for monitoring a transaction, the method comprising
    recording performance data for each of a plurality of methods of a network application, the performance data stored by an agent in a header of an execution thread that executes the method, the agent stored on a machine that executes the plurality of methods;
    ignoring the performance data for one or more of the plurality of methods that satisfy a threshold;
    generating a call graph from the performance data, the call graph indicating the root method of the business transaction and each method called as part of completion of the business transaction; and
    storing the performance data for one or more of the plurality of methods having a root node that does not satisfy a condition.

15. The non-transitory computer-readable storage medium of claim 14, wherein the performance data includes a start time and an end time for execution of the method.

16. The non-transitory computer-readable storage medium of claim 14, wherein the condition includes a threshold for time of execution.

17. The non-transitory computer-readable storage medium of claim 14, wherein the condition includes calling an external Java Virtual Machine.

18. The non-transitory computer-readable storage medium of claim 14, wherein storing the data includes storing execution data and external call data.

19. The non-transitory computer-readable storage medium of claim 14, wherein the performance data is stored in an array within the execution thread header.

20. The non-transitory computer-readable storage medium of claim 14, the method further comprising:

building a call graph for a Java Virtual Machine; and
identifying methods within the call graph that do not satisfy the condition.

21. The non-transitory computer-readable storage medium of claim 14, the method further comprising:
qualifying the methods associated with the stored data;
storing a portion of the stored data based on the qualification of the methods.

22. The non-transitory computer-readable storage medium of claim 14, the method further comprising processing a stored hot spot data to generate a graphical representation of the methods.

23. The non-transitory computer-readable storage medium of claim 14, the method further comprising:
automatically identifying one of the plurality of methods executed as part of a business transaction as part of a learning process; and
recording performance data for each of a plurality of methods associated with the business transaction.

24. The non-transitory computer-readable storage medium of claim 23, wherein automatically identifying includes pre-loading previously stored methods associated with the business transaction.

25. The non-transitory computer-readable storage medium of claim 24, the method further comprising ending the learning process based on a number of times that automatically identifying is performed.

26. The non-transitory computer-readable storage medium of claim 25, the method further comprising re-starting the learning process after a period of time.

* * * * *